Feb. 20, 1940.   F. B. FINK   2,191,275
PROCESS OF COOKING MEAT AND APPARATUS THEREFOR
Filed March 14, 1939   3 Sheets-Sheet 1

Inventor
FRED B. FINK

Attorney

Feb. 20, 1940.   F. B. FINK   2,191,275
PROCESS OF COOKING MEAT AND APPARATUS THEREFOR
Filed March 14, 1939   3 Sheets-Sheet 2
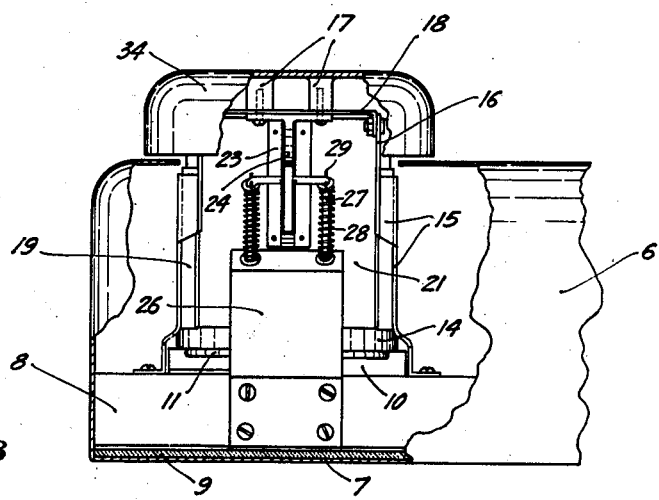
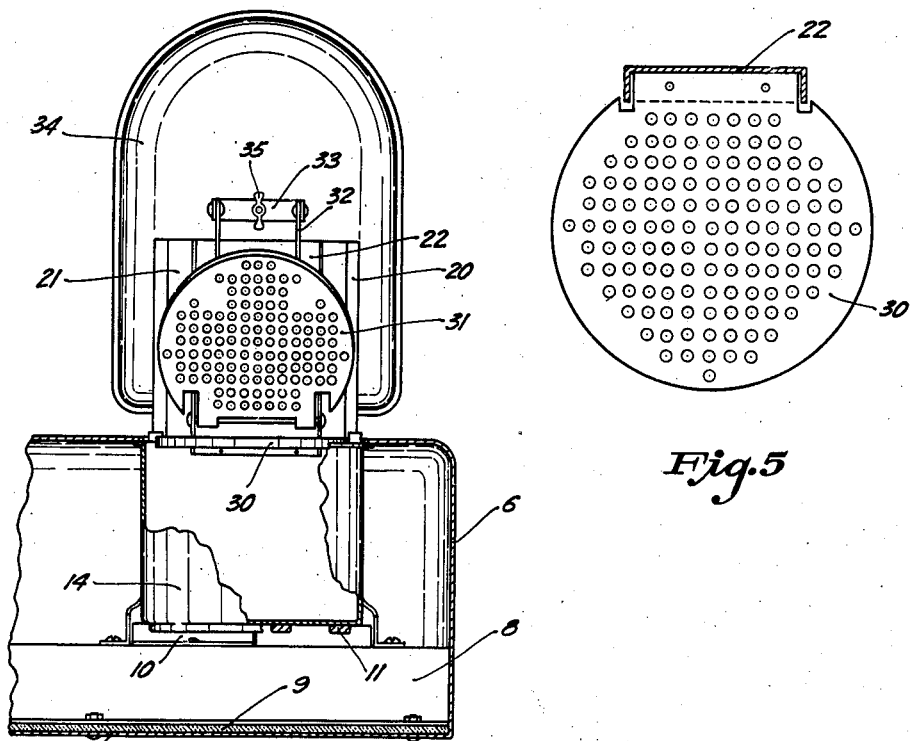
Inventor
FRED B. FINK
By
Attorney Feb. 20, 1940.   F. B. FINK   2,191,275
PROCESS OF COOKING MEAT AND APPARATUS THEREFOR
Filed March 14, 1939   3 Sheets-Sheet 3

Inventor
FRED B. FINK
By
[signature] William C. Blackburn
Attorney

Patented Feb. 20, 1940

2,191,275

UNITED STATES PATENT OFFICE 2,191,275

PROCESS OF COOKING MEAT AND APPARATUS THEREFOR

Fred B. Fink, Davenport, Iowa, assignor to Wafl-Berger, Inc., Moline, Ill., a corporation of Illinois Application March 14, 1939, Serial No. 261,747

11 Claims. (Cl. 53—7)

The present invention relates to a process of cooking meat and to apparatus which is particularly adapted for the performance of the process thereof.

In accordance with conventional procedures, meat is cooked in various fashions, as, for instance, frying, roasting, braising, and barbecuing. Of these procedures, the one ordinarily used for such meat as hamburger is frying, but in frying hamburger or other meats of extended area, such as steaks, there is, in addition to a substantial volume shrinkage of the meat, a tremendous area shrinkage. Thus, for instance, in frying hamburger, starting with a piece about four inches in diameter and about a quarter of an inch thick, the two sides are fried separately and, while the lower side is being fried, substantial quantities of the liquid content of the meat escape out of the top surface thereof which results in a substantial volume shrinkage. The meat will shrink in area from about four inches in diameter to about two inches. For this reason, it is common practice in establishments making hamburger sandwiches to employ a spatula, to press the meat while frying, in an effort to maintain the large area thereof. However, even with such pressure being applied to the meat, it will shrink from about four inches to somewhat less than three. In addition to this drawback, the use of a spatula results in pressing the juice out of the meat. Also, it is to be noted that in pan-frying a piece of hamburger, as described above, it is necessary to fry the meat for about four minutes, two on each side to produce a medium, well done, piece of meat. In the frying of steaks, chops, and the like, there is an additional factor producing an undesirable result inasmuch as with such meats the edges tend to curl up, which curling tends to produce an unsightly product unevenly cooked.

It is accordingly an object of this invention to provide a process of and apparatus for frying meat, particularly such meat as hamburger, steaks, chops, and the like, which substantially prevent area shrinkage of the meat, substantially reduce the volume shrinkage of the meat, and decrease considerably the length of time required to produce equal cooking effect in the meat. It is a further object of this invention to improve the flavor of the meat cooked, by sealing in the meat juices by an initial searing over the entire surface of the meat.

The novel apparatus disclosed in the accompanying drawings is designed for the performance of the process thereof, in which drawings, Fig. 1 is a vertical longitudinal section through the center of a meat cooker in accordance with my present invention, showing the cooker with the lid closed and the meat-holding plates thereof in cooking position;

Fig. 3 is a rear elevation of my meat cooker, shown in Figs. 1 and 2, with portions of the plate and lid broken away, better to show the construction;

Fig. 4 is a section of the meat cooker, showing substantially on the line 4—4 in Fig. 2, with parts of the meat pot broken away to show the construction of the lower plate;

Fig. 5 is a plan view of the lower meat-cooking plate;

Figure 1:
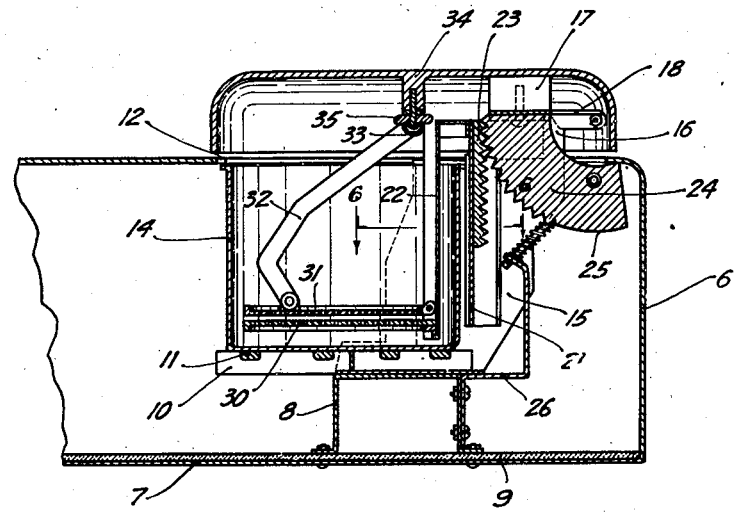
Figure 2:
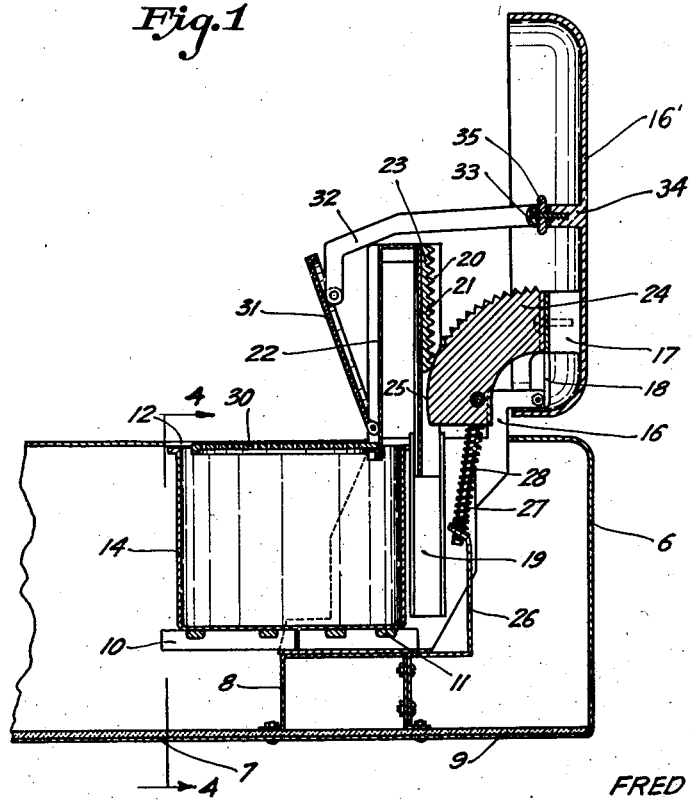
Fig. 2 is a vertical section similar to that shown in Fig. 1 but showing the pot in open position for receiving or removing meat.
Figure 6:
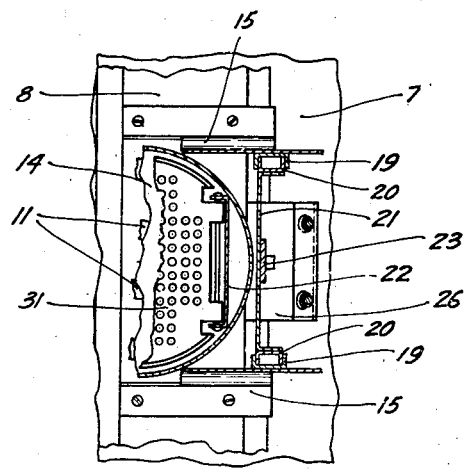
Fig. 6 is a section on the line 6—6 in Fig. 1.

In accordance with the process of this invention, a piece of meat to be cooked is subjected to a slight pressure on both sides thereof throughout substantially the entire area of both sides, with the exception of small areas distributed throughout the surface of both sides, the pressure being of sufficient magnitude to prevent shrinkage during cooking maintaining the meat submerged in a hot oil bath, introducing oil from said bath to the surface of the meat at points distributed about the surface thereof until the meat is cooked as desired, and then removing the meat from the hot oil bath. It is to be seen that by these procedural steps the initial area of the meat is substantially maintained and shrinkage of the meat avoided.

In the construction shown, a case 6 is provided with a bottom 7 in which is secured a support 8 transversely of the plate in the form of a channel member with the flanges thereof secured to the bottom and with an insulating sheet 9 interposed between the bottom 7 and the support 8. A conventional pair of crossarms 10 is secured to the upper surface of the channel support 8 and have in their upper edges a plurality of notches arranged to receive a helically shaped, resistance heater unit 11 of conventional construction. An opening 12 is provided in the upper surface of the case above the heater unit, which opening extends somewhat rearwardly thereof to provide room for operating parts which effect raising and lowering the meat out of the meat pot 14 which rests on the heater unit and extends up into proximity to the edges of the opening 12. A pair of brackets 15 is secured to the channel support 8 in facing position on opposite sides of the meat pot toward the rear portion thereof, which brackets are provided with arms 16 extending upwardly out of the opening in the top of the case and rearwardly over the case.

A lid 16' is provided to substantially cover the opening 12 in the case. This lid is provided with a pair of bosses 17 to which is secured the plate 18 provided with pivots engaging the arms 16 whereby the lid may be opened and closed by turning about this pivot. A pair of facing vertical channel guides 19 is secured to the pair of brackets 15, immediately to the rear of the meat pot. A pair of channels 20, complemental therewith, are arranged at the opposite edges of a plate 21 whereby the plate 21 and the channels 20 carried thereby may be moved in and are guided vertically by the channels 19. An arm 22 is secured to the upper end of the plate 21 and, when the plate 21 is in its lowermost position, extends into a position at one side of the meat pot 14 in the lower portion thereof. A rack 23 is secured to the plate 21 in a vertical position medially of the channels 20. A complemental sector gear 24 is secured to the lugs or bosses 17 to mate and engage with the rack 23, the center of curvature of the sector gear being positioned on the pivotal axis of the lid. Sector gear 24 is provided with a latch tooth 25 which has a greater radius of curvature than the radius of the bottoms of the notches between the teeth of the sector gear. The radius of tooth 25 is just sufficient that, when the rack 23 is in uppermost position, the tooth 25 will pass the lowest tooth on the rack 23 so that such lowest tooth will slide over the surface of the latch tooth 25. It is to be noted that the rack in elevated position has the lowest tooth thereof above the pivotal center of the lid, whereby the portion of the latch tooth engaging the lowest tooth of the rack 23 is farther to the rear than the portion of the latch tooth on the same elevation as the pivot. This described relationship of the rack 23 and the sector gear 24 prevents downward motion of the rack 23, even under pressure from the raised position thereof with the lid open to such an extent that the latch tooth 25 is in engagement with the lowest tooth of the rack.

A dead center opening and closing spring is provided for the lid which involves a bracket 26 secured to the channel support 8. A U-shaped rod 27 has the bight portion thereof pivotally engaging the sector gear 24 and has the arms thereof through openings in the upper end of the bracket 26. Springs 28 are positioned on the arms of the U-shaped rod 27 and are confined between stop members 29 and the bracket 26. The pivotal connection between the bar 27 and the sector gear 24 is so positioned with respect to the sector gear that the pivot of the lid, the pivot between the bar 27 and rack 24, and the openings in the bracket 26 into which the bar 27 engages are in alignment at a position of the lid between open position and closed position.

A pair of pressure plates 30, 31 is secured adjacent the lower end of the arm 22, the lower plate 30 being secured in a position substantially perpendicular to the arm. The upper plate 31 is pivotally secured to the arm 22, and a pair of arms 32 is pivoted to plate 31 adjacent the outer edge of the plate, that is, the edge removed from the pivot of the plate to the arm 22. The links 32 are pivoted to a U-shaped bracket which is secured to the lid by an easily removable connection such as a slot in the bracket 33 which engages between a boss 34, integral with the lid, and a wing bolt threadedly engaging the boss. The links 32 are of such a length that, in the lowered position of the meat-cooking plate and with the lid in lowered position, the plates are held at the desired distance apart.

The spacing between the cooking plates 30, 31 is dependent upon the thickness of the meat which it is intended to cook between the plates. The thickness of the meat should be such, considering the distance between the plates, that the spring 28 places a slight spring pressure on the meat, sufficient to prevent shrinkage of the area thereof.

In operation, the current is turned on in the resistance heater and the oil in the pot 14 is brought up to cooking temperature. The lid 16' is then raised whereby the cooking plates 30, 31 are raised due to the rack 23 being raised by the sector gear 24. The pivotal motion of the lid also draws the links 32 upwardly and rearwardly sufficient that the upper plate 31 is moved apart from the lower plate 30. The meat to be cooked is then placed on the lower plate and the lid closed. After the lapse of sufficient time that the meat is cooked to the desired amount, the lid is then opened and the meat removed from the lower plate. As the plates latch in raised position, pressure may be placed on the lower plate in removing the meat. For facility in the use of the device, the temperature of the oil in the pot should be thermostatically controlled, the thermostat regulating the current flowing in the resistance element.

Figure 7:
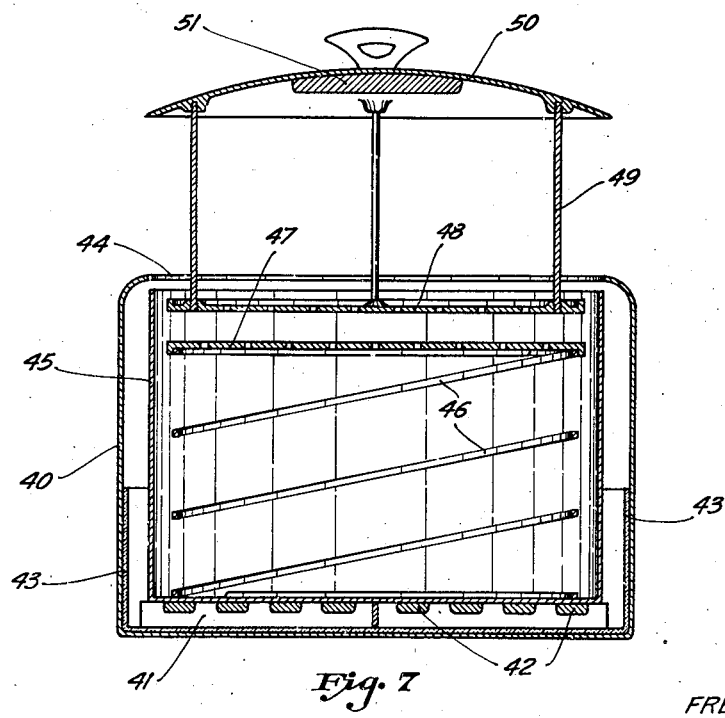
Fig. 7 is a vertical section through a modified form of the device.

In the form of the device shown in Fig. 7, a casing 40 is provided with a pair of crossarms 41 in the lower portion thereof, which crossarms carry an electrical resistance element 42 in notches in the upper edges of the crossarms 41. The casing 40 is internally insulated with a lining material 43 which may be sheet asbestos or the like. The upper sde of the casing 40 is provided with an opening 44 throughout substantially its extent and of a size to allow insertion of a cooking pot 45 which rests on the resistance element 42. A coil spring 46 is provided in the cooking pot 45 and rests upon the bottom thereof. The upper end of the coil spring supports a meat cooking plate 47 similar in character to those employed in the device shown in Figs. 1 to 6. A complemental plate 48 is secured, by support 49, to a lid 50 designed to rest on the upper edge of the casing 40. The unit comprising the plates 48 and the lid 50 is provided with a weight 51 of sufficient magnitude to overcome the upward pressure of the spring 46 and carry the lid 50 into contact with the case. The spring 46 determines the pressure exerted on the meat during the cooking operation.

In operation, oil is placed in the pot 45 to a level somewhat below the plate 47. Current is delivered to the resistance element 42 through leads, not shown, and is controlled by a thermostat, not shown, which thermostat is responsive to the temperature of the oil in the pot 45. When the temperature of the oil has reached a suitable cooking temperature, the lid unit with its associated plate 48 is removed. A piece of meat which it is desired to cook, or, in case of large apparatus, several pieces of meat are placed on the plate 47 and the lid is then properly positioned. The plate 48, by bearing on the meat, depresses the plate 47 against the action of the spring until the lid 50 is in contact with the case 40. The two plates exert sufficient pressure on the meat so that the perforations in the plate hold the meat from contracting in area, and the two plates prevent curling of the meat. The oil which in elevated position of the lower plate is below the plate covers both plates and the meat when in cooking position.

Having now described my invention, I claim:

1. The process of cooking meat comprising submerging the meat in a hot oil bath, applying pressure throughout most of the area of the surfaces of the meat, the portions of said surfaces in which pressure is not applied being distributed generally over said surfaces, and introducing hot oil from said bath onto the meat at the portions of surface where pressure is not applied.

2. The process of cooking meat comprising submerging the meat in a hot oil bath, applying pressure throughout most of the area of the surfaces of the meat, holding the meat distended so as to avoid area shrinkage thereof, and introducing hot oil from said bath onto the meat at a multitude of points distributed over the surfaces of the meat.

3. A meat cooking apparatus comprising a pair of plates to apply pressure to opposite sides of a piece of meat, a pot for containing oil, means to move and guide said plates vertically in said pot, and means to actuate the first named means and to apply closing pressure on said plates when moved downwardly in said pot.

4. Meat-cooking apparatus comprising a pair of pressure plates, a pot for containing oil, means for guiding said plates in movement vertically in said pot, and means to move the plates relatively apart when they are moved upwardly in the pot.

5. Meat-cooking apparatus comprising a pair of pressure plates, a pot for containing oil, means for guiding said plates in movement vertically in said pot, and common means to effect raising and opening of said plates and to effect lowering and closing of said plates.

6. Meat-cooking apparatus comprising a pot for containing cooking oil arranged to be heated, a pair of perforated pressure plates between which meat may be positioned, and a lid for said cooking apparatus operatively connected to at least one of said plates, the lid being movable from an open position to a closed position on said apparatus, closing of said lid effecting movement of said plates together and lowering of said plates into the oil.

7. Meat-cooking apparatus comprising a pair of plates for applying pressure throughout most of the area of both sides of a piece of meat, at least one of said plates being perforated at points distributed over the surface thereof, the area of said perforations between all perforations being sufficient to avoid cutting into the meat, and means to press the plates together when a piece of meat is placed therebetween.

8. Meat-cooking apparatus comprising a pair of complemental pressure plates having pressure surfaces throughout a major portion of the area thereof and openings through the plates totaling a minor portion of the area of the surfaces, and means to tension said plates toward each other at a spaced distance.

9. A meat-cooking apparatus comprising a pot for holding oil, a pair of perforated pressure plates, means to lower the plates into the pot, and means to apply spring pressure to the plates and thereby apply spring pressure to meat between said plates.

10. A meat-cooking apparatus comprising a pot for holding oil, a pair of perforated pressure plates, means to guide said plates from a lowered position in said pot with the plates in proximal position and to guide said plates to a raised position with said plates relatively spaced apart, and means to hold said plates in said raised spaced position.

11. A meat cooking apparatus comprising a pot for containing cooking oil, a perforated plate, a spring resting in the lower portion of said pot and supporting said plate, and a weighted perforated plate movable into said pot into a position parallel to the first mentioned plate, the weight being of sufficient magnitude as to depress said first mentioned plate against the action of the spring.

FRED B. FINK.